United States Patent Office 3,143,874
Patented Aug. 11, 1964

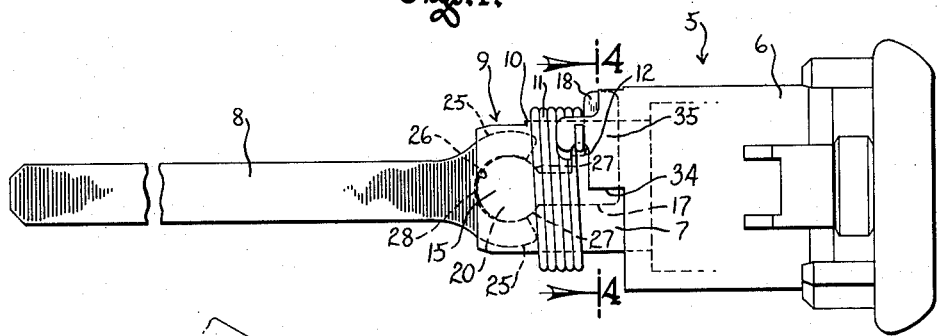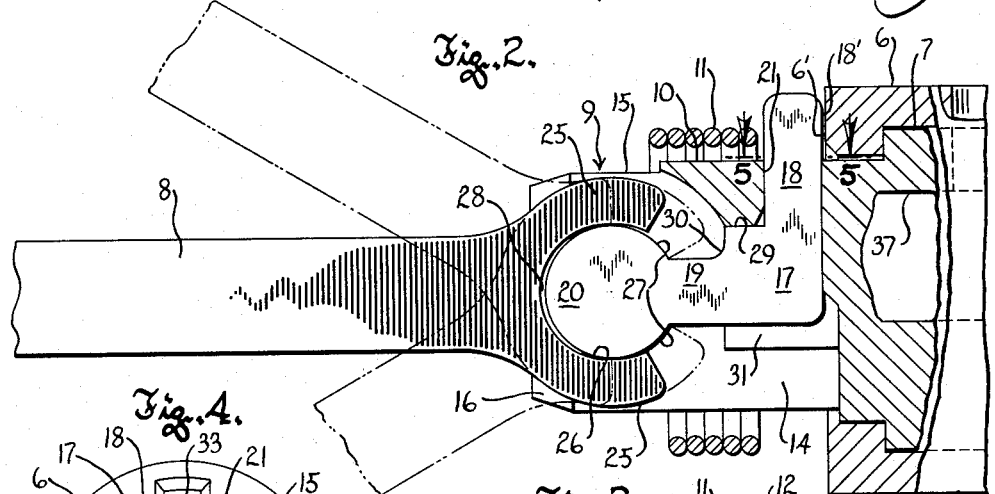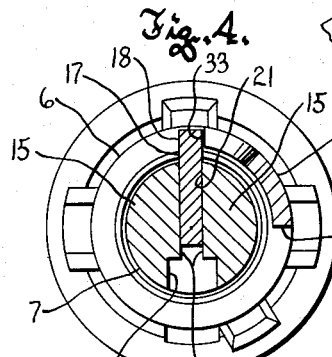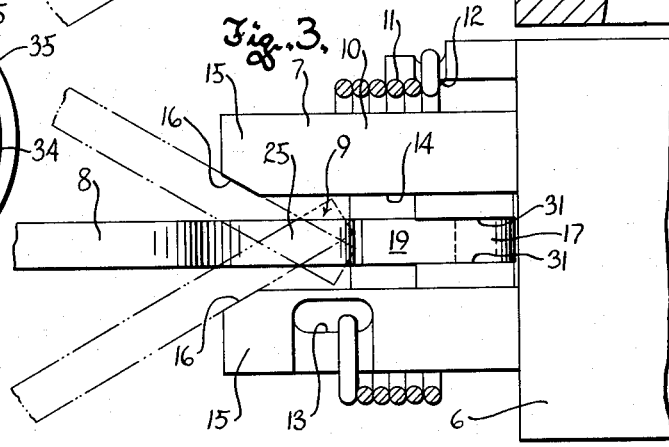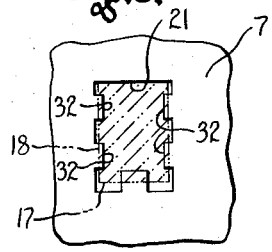

3,143,874
AUTOMOBILE LOCK HAVING SWINGABLE SHAFT
Edward N. Jacobi, Milwaukee, Wis., assignor to Briggs & Stratton Corporation, Milwaukee, Wis., a corporation of Delaware
Filed Aug. 17, 1962, Ser. No. 217,563
8 Claims. (Cl. 70—379)

This invention relates to locks and refers more particularly to automobile door locks of the type known as pillar locks.

Characteristic of a pillar lock is a driving or operating shaft which is coupled with the lock cylinder and which projects axially rearwardly from the cylinder to transmit key actuated rotation of the cylinder to a rotary door latch mechanism to be actuated. It has long been recognized that it is desirable to so connect the driving shaft with the lock cylinder, or with an extension of the cylinder on the rear thereof, as to afford the shaft a limited degree of universal swinging motion relative to the cylinder, to thus enable the shaft to compensate for misalignment between the lock casing and the latch mechanism on the door.

One very simple and relatively successful means of achieving such a universal joint connection between the lock cylinder and the shaft is disclosed in the patent to Edward N. Jacobi, No. 2,655,028, for Rear Compartment Lock. The mechanism of that patent provided for about 10° of shaft deviation in every direction, which was sufficient where the cylinder lock and the driven rotary latch member were coaxial in their normal mean locations and departed from coaxiality only within the limits of production tolerances.

Recently, however, the requirements of automobile body styling have dictated that the axes of the cylinder lock and rotary latch member be offset in their normal mean positions. In some instances these axes have been laterally offset relative to one another, but in most cases the inner wall of the door, on which the latch mechanism is mounted, does not have its plane parallel to a plane tangent to the outer wall, on which the lock mechanism is mounted. The result in either case is that the shaft is required to have substantially more than the 10° of universal swinging motion provided for by the structure of the aforesaid patent. In some cases the shaft must be capable of swinging nearly 30° out of coaxiality with the cylinder to satisfactorily meet the requirements of these new automobile body styles.

When a lock of the type disclosed in the above mentioned patent was used in such an installation, its shaft would be sprung out of its slot or socket in the cylinder extension, sometimes damaging or unhooking the torsion spring which held the shaft in place and provided rotational bias on the cylinder.

One expedient that has been used for preventing such dislocation of the shaft was the installation of a rivet bridging the shaft receiving slot in the cylinder extension and extending through a loosely fitting hole in the front end portion of the shaft. Since the rivet holes in the cylinder extension could not be readily cored in the lock cylinder casting, they had to be formed by a separate drilling operation; and installation of the rivet necessitated the labor of a further operation during assembly of the lock. Moreover, while this expedient successfully prevented dislocation of the shaft from the cylinder extension, it resulted in an undesirably large amount of lost motion between the cylinder and the rotary latch mechanism to which it was coupled by the shaft.

With the foregoing in mind, it is an object of the present invention to provide a pillar lock of the character described wherein the shaft is so connected with the cylinder as to be swingable out of coaxiality with the cylinder through about 30° in all directions without any danger that the shaft will become disconnected from the cylinder, and without creating excessive lost motion between the cylinder and a mechanism to which it is coupled by the shaft, and wherein the shaft, which can be formed as a simple stamping, is secured to the cylinder by means of a very simple stamped coupling member that is capable of performing certain other important functions in the lock assembly.

Another object of the invention is to provide a pillar lock of the character described which can be very quickly and easily assembled by relatively unskilled labor without the use of special equipment, and wherein the shaft which transmits lock cylinder rotation is capable of a wide range of universal swinging motion without becoming detached from the cylinder.

It is also an object of this invention to provide a pillar lock of the character described having its shaft secured to its cylinder by means of a simple stamped link or coupling member which can be press fitted into an integral rearward extension on the cylinder and which can also provide an abutment that cooperates with the rear edge of the lock casing to prevent forward displacement of the cylinder out of the casing and can cooperate with stop abutments on the casing to define the limits of cylinder rotation.

Still another object of this invention is to provide a pillar lock of the character described wherein the cylinder of the lock needs no drilling or other machining operation after casting to prepare it for assembly with the shaft and the coupling member by which the shaft is connected with the cylinder, and wherein the coupling member is received in a cored hole in the cylinder extension that extends parallel to the tumbler bores in the cylinder, so that the coring of said hole can be accomplished in the die casting machine by means of the same core pull that provides for coring of the tumbler bores.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which:

FIGURE 1 is a side view of a pillar lock embodying the principles of this invention;

FIGURE 2 is a longitudinal sectional view on a larger scale of the lock shown in FIGURE 1;

FIGURE 3 is a bottom view of the lock, to the same scale as FIGURE 2;

FIGURE 4 is a cross sectional view taken on the plane of the line 4—4 in FIGURE 1; and FIGURE 5 is a fragmentary sectional view taken on the plane of the line 5—5 in FIGURE 2.

Referring now more particularly to the accompanying drawing, the numeral 5 designates generally a cylinder lock of the type intended for installation in an automobile door or rear deck lid and which comprises, in general, a bored casing 6 and a key actuatable cylinder 7 rotatable in the casing and accessible at the front of the casing to permit insertion of a key thereinto.

Key propelled rotation of the cylinder 7 is transmitted to a rotary latch mechanism (not shown) or other mechanism controlled by the lock, by means of an elongated shaft 8, which is preferably formed as a flat stamping and which has a universal joint connection, generally designated 9, with an integral rearward extension 10 of the lock cylinder that projects behind the casing 6. Surrounding the forward portion of the cylinder extension is a coiled torsion spring 11 having its end portions bent to define hooks which are respectively engaged over a hook 12 on the casing and in a small substantially radially opening slot 13 in the cylinder extension, to thus bias the cylinder to a locked position of rotation.

Extending lengthwise of the cylinder extension 10 is a slot 14 which opens radially to one side of the extension and toward its rear, and which is substantially deep radially, having its bottom spaced a substantial distance to the opposite side of the cylinder axis from its mouth. The rear portion of the extension comprises a pair of rearwardly extending arms or bifurcations 15, which cooperate to define a rearward continuation of the slot 14. The front portion of the shaft 8 is confined between the arms 15, and to allow the shaft to have a wide range of universal swinging motion about its connection 9 with the cylinder the rear end portions of the arms 15 have their opposing faces rearwardly divergently inclined to the lock axis, as at 16.

The connection between the shaft 8 and the cylinder comprises a generally L-shaped link or coupling member 17, which can be readily formed as a flat stamping and can be made from metal having substantially the same thickness as the shaft. The coupling member has a radial arm 18 by which it is secured to the cylinder and an axial arm 19 that terminates at its rear in an enlarged rounded head 20 that provides the connection with the shaft. The radial arm 18 of the link or coupling member is press fitted into a hole 21 in the cylinder extension which opens radially from the bottom of the slot 14, to the side of the extension opposite the mouth of the slot, and which is located at the front of the extension, directly behind the rear edge of the casing. A portion of the arm 18 projects radially beyond the side surface of the extension to provide a forwardly facing abutment 18' which slidingly engages the rear edge 6' of the casing too prevent forward withdrawal of the cylinder out of the casing.

The axial arm 19 of the L-shaped coupling member 17 extends along the cylinder axis, and the disc-like substantially circular head 20 at its rear end is located between the arms or bifurcations 15 on the rear of the extension. The connection between the coupling member and the shaft 8 is provided by a pair of rounded arms or bifurcations 25 on the front of the shaft that cooperate in defining a socket 26 in which the head 20 on the coupling member is received. The arms 25 converge toward their front ends so that the mouth of the socket that they define has a width substantially less than the diameter of the head 20, and the head thus provides rounded generally forwardly facing shoulders 27 which cooperate with the inner socket defining surfaces of the arms to prevent rearward disengagement of the shaft from the coupling member while providing for a substantial degree of edgewise swinging of the shaft about the axis of the head.

Along a line transverse to the length of the shaft the diameter of the socket is substantially equal to that of the head, so that at areas near said line the socket closely fits the head. Since the shaft and coupling member are made of metal of the same thickness and have substantially square cut edges as a result of being stamped, the engagement of the head and socket at diametrically opposite points constrains the shaft to rotate with the cylinder, without substantial lost motion between them. However, to provide for flatwise swinging of the shaft, relative to the coupling member 17 and the cylinder, some clearance as at 28 must be provided between the head 20 and the rear of the socket, and to this end the socket can have a slightly elliptical shape, being elongated lengthwise of the shaft, while the head 20 has an undistorted circular outline. As an obvious alternative the socket could have a true circular outline and the rear portion of the head could be flattened to provide the necessary clearance 28.

The rearwardly projecting arms or bifurcations 15 on the cylinder extension loosely confine the socketed front end portion of the shaft to hold it against displacement off of the head in directions parallel to the axis of the head, and also tend to constrain the shaft to rotate with the cylinder. To enable the bifurcations 15 to perform these functions, their opposing faces, forwardly of the inclined surfaces 16, are spaced apart by a distance sufficient to permit swinging of the front end portions of the socket defining arms 25 on the shaft but not so great as to permit the shaft to be flatwise displaced entirely off of the head, which distance may be about twice the thickness of the shaft.

At the inner corner defined by the junction of its two arms 18 and 19, the coupling member 17 is stepped to provide a radially outwardly facing shoulder 29 that engages the bottom of the slot 14 in the cylinder extension, directly behind the radial hole 21, to cooperate with the radial arm 18 of the coupling member in preventing edgewise displacement of the same. Rearwardly of the shoulder 29 the bottom of the slot is rounded, as at 30, substantially coaxially with the head 20 on the coupling member, to provide clearance for the rounded socket defining bifurcations on the shaft.

Cooperating with the hole 21 to confine the coupling member against edgewise and flatwise displacement, the front portion of the slot 14 in the cylinder extension has a width substantially equal to the thickness of the coupling member, this narrower portion of the slot being defined by inward offsets 31 on the opposing extension surfaces that define the slot.

To insure that the radial arm 18 of the coupling member has a good press fit in the hole 21 in the cylinder extension, despite inevitable variations in the thickness of the metal from which the coupling member is stamped, the surfaces of the hole have raised ridges 32 (see FIGURE 5) which are intended to be crushed or deformed as the radial arm is driven into the hole. It will be appreciated that the hole 21 preferably has its axis so oriented relative to the cavity 37 in the cylinder which receives the tumblers (not shown) and defines the key receiving slot that both the hole 21 and said cavity can be formed by means of a single core pull in the die casting machine in which the cylinder is cast. In other words, if the cylinder has radially opening tumbler bores of a conventional type, the hole 21 has its axis parallel to the tumbler bore axes and opens to the same side of the cylinder.

In assembling the mechanism, the cylinder is inserted into the casing, and the shaft and retaining member are preassembled by simply slipping the head 20 on the retaining member into the socket 26 of the shaft. With the shaft and retaining member thus preassembled they are moved edgewise into the slot 14 in the cylinder extension, from the mouth of the slot and in a direction parallel to the radial arm 18. The radial arm is forced into the hole 21 until the shoulder 29 seats on the bottom of the slot 14 and thereafter the torsion spring 11 can be slipped endwise over the shaft from the rear thereof, slid forwardly on the cylinder extension, and connected with the cylinder and casing.

In addition to preventing forward withdrawal of the cylinder out of the casing and thus contributing to the security of the lock, the radially outwardly projecting end portion of the radial arm 18 of the coupling member also provides circumferentially facing abutments which can cooperate with rotation stops 33 and 34 on a rearwardly projecting ledge 35 on the casing, to define the limits of cylinder rotation in the casing.

From the foregoing description taken together with the accompanying drawings it will be apparent that this invention provides a pillar lock for automobile doors and the like having a shaft for transmitting cylinder rotation to a rotary latch mechanism, which shaft is connected to the cylinder by a very simple, inexpensive and easily installed coupling member but is nevertheless capable of wide swinging motion in all directions relative to the cylinder, and wherein the coupling member also cooperates with the casing of the lock to prevent forward withdrawal of the cylinder out of the casing and to provide stops which define the limits of cylinder rotation.

What is claimed as my invention is:

1. In a lock of the type having a bored casing and a key actuated lock cylinder rotatable in the casing and accessible at the front thereof for insertion of a key:
   (A) an extension on the cylinder projecting rearwardly beyond the casing, said extension having
      (1) a slot therein that opens axially rearwardly and radially to one side of the extension,
      (2) a hole opening radially from said slot to the opposite side of the extension and which hole is spaced forwardly from the rear end of the extension;
   (B) a substantially L-shaped coupling member,
      (1) one arm of said coupling member being snugly received in said hole in the extension and projecting radially beyond the side surface thereof so that the projecting portion of said arm provides a forwardly facing abutment that slidingly engages the rear edge of the casing and cooperates therewith to prevent forward withdrawal of the cylinder out of the casing,
      (2) the other arm of said coupling member extending substantially coaxially rearwardly in said slot and terminating at its rear extremity in an enlargement providing rounded shoulders that face generally forwardly;
   (C) a shaft having a bifurcated front end portion providing arms that converge forwardly toward one another and embrace said shoulders on the enlargement, said arms having a thickness such that the sides of the slot confine them against displacement off of the enlargement and constrain the shaft to rotate with the cylinder without interfering with swinging motion of the shaft in all directions.

2. The lock of claim 1, further characterized by means on the rear of the casing defining circumferentially facing abutments engageable by the radially projecting portion of the first designated arm of the coupling member to cooperate therewith in providing stops which define limits of cylinder rotation.

3. In a lock of the type having a bored casing and a key actuated lock cylinder rotatable in the casing and accessible at the front thereof for insertion of a key:
   (A) an extension on the cylinder projecting rearwardly beyond the casing and the rear portion of which is bifurcated;
   (B) a coupling member
      (1) having one arm that extends substantially coaxially rearwardly between the bifurcations of the extension and which terminates at its rear end in an enlarged head providing rounded substantially forwardly facing shoulders,
      (2) having another arm extending radially through a snugly fitting hole in the extension by which the coupling member is held against displacement relative to the extension; and
   (C) a shaft having a bifurcated front end portion defining arms having rounded forwardly converging inner surfaces between which the head on the coupling member is received, said arms having a thickness less than the distance between the bifurcations of the extension so that the rear end of the shaft is swingable in all directions, but being thick enough so that the bifurcations of the extension confine the arms against displacement off of the head.

4. In a lock of the type having a bored casing and a key actuated lock cylinder rotatable in the casing and accessible at the front thereof for insertion of a key:
   (A) an extension on the cylinder projecting rearwardly therefrom beyond the casing, the rear portion of said extension being bifurcated by a slot that opens to the rear of the extension and radially to one side thereof, and said extension having a radially extending hole near its front that opens from said slot to its other side;
   (B) a flat, stamped substantially L-shaped coupling member having
      (1) one arm snugly received in said hole in the extension to be thereby held against movement relative to the extension and
      (2) having its other arm projecting rearwardly between the bifurcations of the extension and terminating at its rear in an enlarged substantially disc-like head; and
   (C) a flat, stamped shaft having a bifurcated front end portion that defines a rounded socket in which the head on the coupling member is received and which is loosely confined between the bifurcations of the extension so that said bifurcations on the extension constrain the shaft to rotate with the cylinder and hold it against displacement off of the head on the coupling member without interfering with swinging movement of the shaft in all directions relative to the extension.

5. The lock of claim 4 wherein the first designated arm of the coupling member projects radially beyond said other side of the extension and provides a forwardly facing abutment cooperable with the rear edge of the casing to prevent forward displacement of the cylinder out of the casing, and provides circumferentially facing abutments cooperable with abutments on the rear of the casing to define cylinder rotation stops.

6. In a lock of the type having a bored casing and a key actuated lock cylinder rotatable in the casing and accessible at the front thereof for insertion of a key:
   (A) an extension on the cylinder projecting rearwardly beyond the casing, said extension having
      (1) an axially extending slot opening to one side thereof, and
      (2) a hole near its front opening from the bottom of said slot to the other side of the extension;
   (B) a coupling member
      (1) having a radial arm that is snugly received in said hole in the extension to secure the coupling member to the extension and
      (2) having an axial arm that extends substantially coaxially rearwardly in said slot and which terminates at its rear end in an enlarged head providing rounded shoulders that face generally forwardly;
   (C) a shaft having a pair of arms on its front end portion that define rounded forwardly converging surfaces which embrace said shoulders on the head to provide a pivoted connection between the shaft and the head by which the shaft is held against rearward displacement relative to the head; and
   (D) a pair of rearwardly extending arms on the rear of the extension, spaced to opposite sides of the head on the coupling member and which loosely confine the arms on the shaft against disengagement from the head without interfering with swinging motion of the shaft in all directions relative to the extension.

7. In a lock of the type having a bored casing and a key actuated lock cylinder rotatable in the casing and accessible at the front thereof for insertion of a key:
   (A) an extension on the cylinder projecting rearwardly therefrom beyond the casing, the rear portion of said extension being bifurcated by a slot that opens to the rear of the extension, and said extension having a radially extending hole near its front that opens from said slot;
(B) a coupling member having
(1) an arm snugly received in said hole in the extension to be held thereby against movement relative to the extension, and
(2) a rounded head integral with said arm and disposed between the bifurcations of the extension; and
(C) a flat shaft having a bifurcated front end portion that defines a rounded socket in which the head on the coupling member is received and which is loosely confined between the sides of the slot in the extension so that said sides of the slot constrain the shaft to rotate with the cylinder and hold it against displacement off of the head of the coupling member without interfering with swinging movement of the shaft in all directions relative to the extension.

8. In a lock of the type having a bored casing and a lock cylinder rotatable in the casing and accessible at the front thereof, said cylinder having a cavity therein which opens substantially radially to one side thereof and to its front end:
(A) an extension on the cylinder projecting rearwardly therefrom beyond the casing, the rear portion of said extension being bifurcated by a slot that opens to the rear of the extension, and said extension having a hole therein, spaced from its rear end, communicating with said slot and opening to one side of the extension in the same substantially radial direction that the cavity in the cylinder opens, so that said hole in the extension can be formed by means of a core pull which is also used for forming said cavity;
(B) a coupling member having
(1) an elongated portion snugly received in said hole in the extension to be held thereby against movement relative to the extension, said elongated portion projecting radially beyond the extension and engaging the rear of the casing to prevent forward displacement of the cylinder out of the casing, and
(2) a substantially cylindrical portion disposed in the slot in the extension and the axis of which is normal to that of the cylinder; and
(C) a flat shaft having a bifurcated front end portion that defines a rounded socket in which said cylindrical portion on the coupling member is received and which is loosely confined in the slot in the extension so that portions of the extension on opposite sides of the slot constrain the shaft to rotate with the cylinder and hold it against displacement off of the cylindrical portion of the coupling member without interfering with swinging movement of the shaft in all directions relative to the extension.

References Cited in the file of this patent
UNITED STATES PATENTS

| | | |
|---|---|---|
| 1,792,990 | La Van Way | Feb. 17, 1931 |
| 2,348,135 | Jacobi | May 2, 1944 |
| 2,530,469 | Jacobi | Nov. 21, 1950 |

FOREIGN PATENTS

| | | |
|---|---|---|
| 332,531 | Germany | Jan. 31, 1921 |